INVENTOR
Frank A. Ryder
BY
ATTORNEY

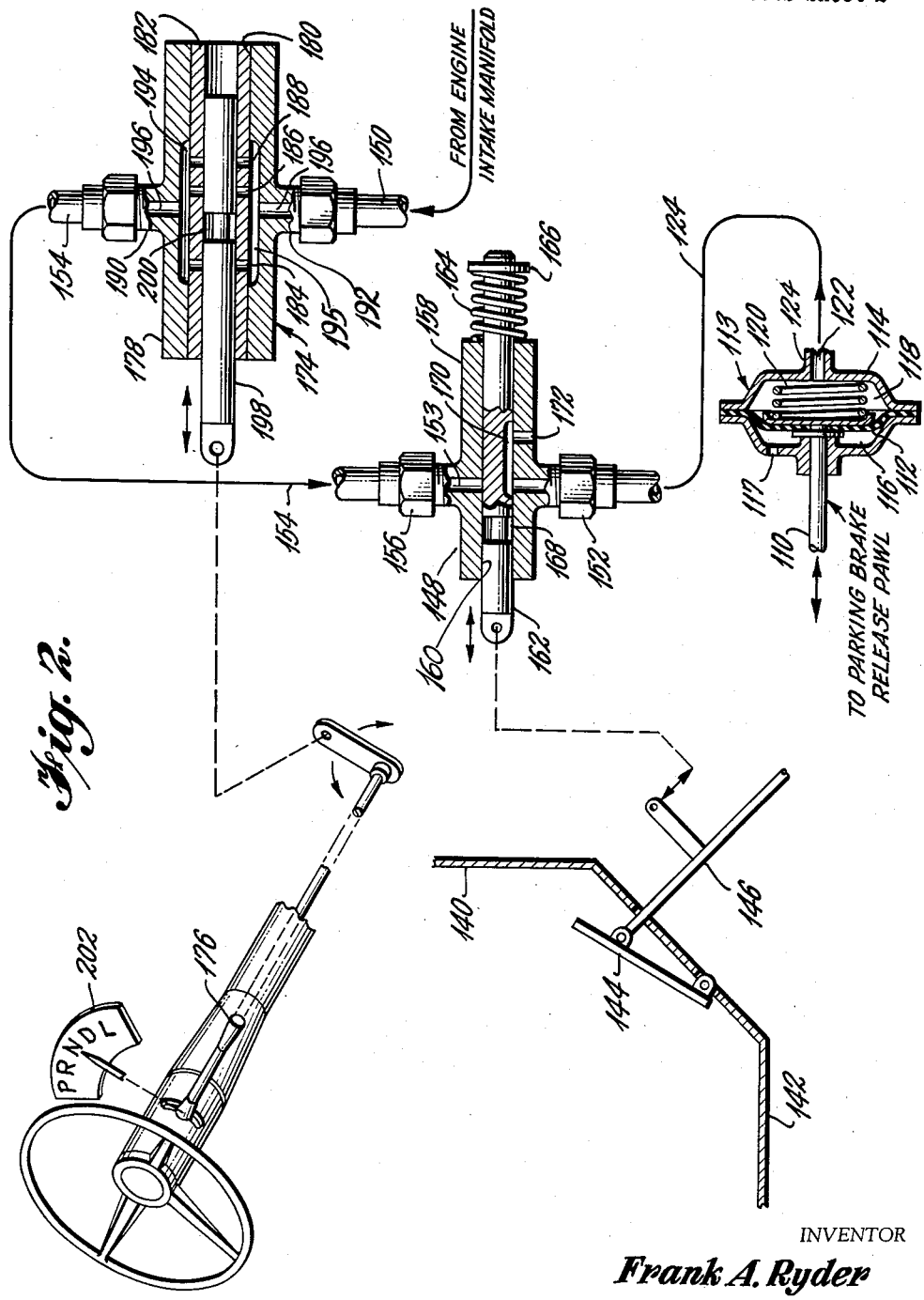

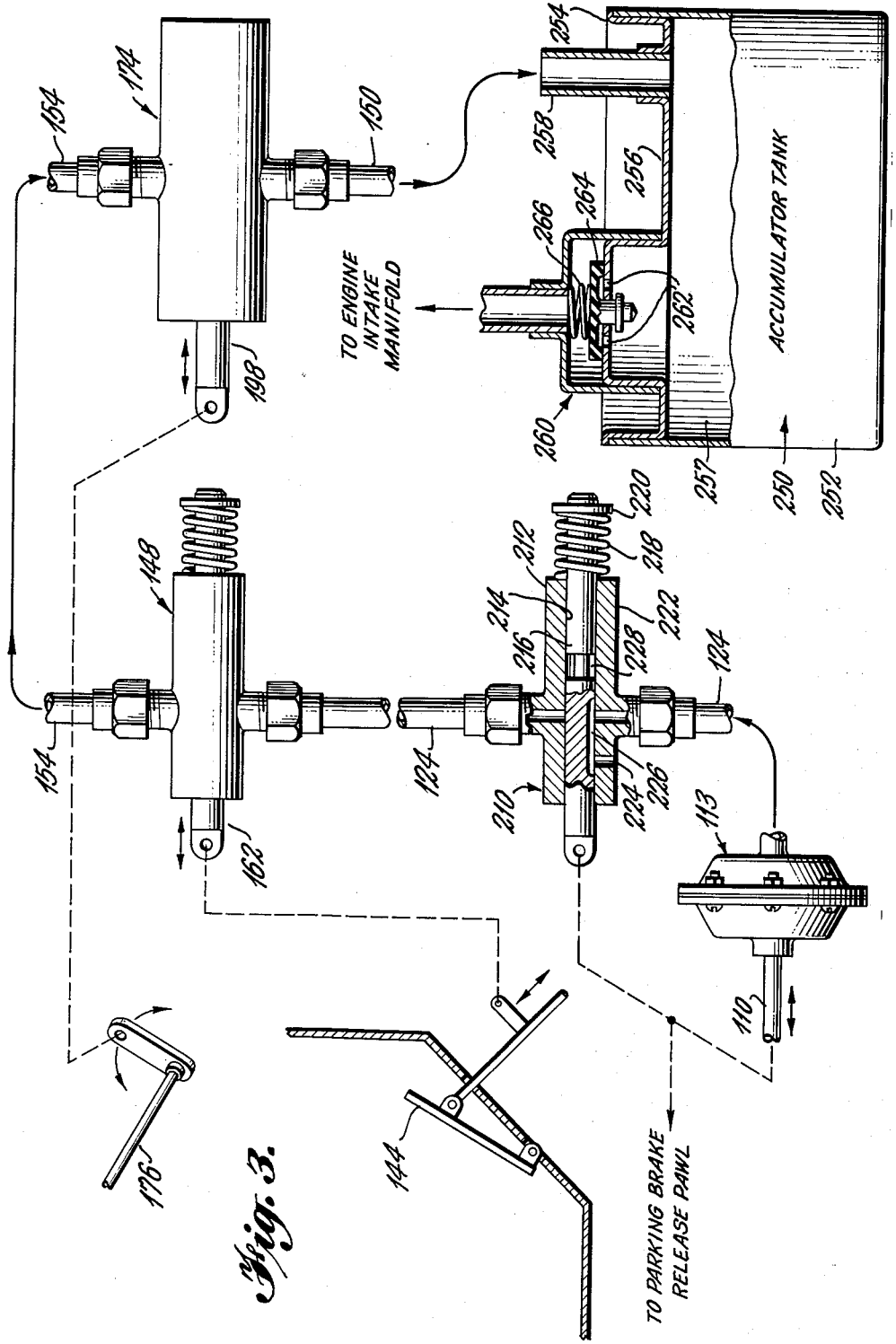

United States Patent Office 3,119,477
Patented Jan. 28, 1964

3,119,477
AUTOMATIC PARKING BRAKE RELEASE SYSTEM
Frank A. Ryder, Springfield, Ill., assignor to Stewart-Warner Corporation, Chicago, Ill., a corporation of Virginia
Filed Apr. 18, 1960, Ser. No. 23,001
15 Claims. (Cl. 192—3)

This invention relates to an automatic parking brake release system and more particularly to such a system in which the automatic means are actuated only after all the conditions inherently necessary prior to actual operation of the vehicle are present.

In the operation of vehicles such as automobiles or trucks, there are many occasions which require the operator of the machine to brake the vehicle and retain the braking force for periods of time ranging from a few seconds to hours. For instance, when a heavily loaded vehicle is brought to a stop on an incline, rather than have the operator retain his foot on the brake pedal controlling the primary brake system, the operator often sets an emergency or parking brake by use of a handle or foot operated detent device. Whether the vehicle is again started in motion within a few seconds or after some period of time, the operator sometimes inadvertently forgets that his vehicle is in the braked condition and tries to accelerate with the emergency brake set. Of course, this is not only detrimental to the braking system of the vehicle, but often the car or truck stalls as a result of the heavy load resulting from having the brakes set in braking position.

There have in the past been developed systems for automatically releasing the emergency brake or other brake of an automobile or truck. However, in the prior art devices, the systems normally incorporate suitable means responsive to only one or two conditions indicative or intention to start vehicle movement, such as being responsive to depression of the accelerator pedal or ignition switch. When a vehicle is parked on an incline with the parking or emergency brakes set, it is best not to automatically release the brakes upon depressing the accelerator pedal only or turning on the ignition switch as the vehicle will start to roll down the incline before the operator selects the transmission gear or setting for vehicle movement. Due to the infinite variety of driving conditions it is most desirable to automatically release a set parking brake only upon a clear intention of the operator to cause vehicle movement. Such intention would be manifested by starting and running the engine, depressing the accelerator or clutch, and selecting a transmission setting for movement either forward or backwards. It is therefore the primary object of this invention to provide an improved automatic parking brake release system for a vehicle in which the parking brake is released automatically only when all the necessary conditions inherent in instigating actual movement of the vehicle are present.

It is also an object of this invention to provide a greatly simplified automatic parking brake release system which is both economical in construction and highly efficient in operation. It is a further object of this invention to provide an improved automatic parking brake releasing system which may be completely mechanical in nature, or which may include electrically operated elements as desired. It is another object of this invention to provide an improved automatic parking brake release system which may be adapted for use on present vehicles without requiring extensive modification thereof.

Other objects of this invention will be pointed out in the following detailed description and claims and illustrated in the accompanying drawings, which disclose, by way of example, the principle of this invention and the best mode which has been contemplated of applying this principle.

In the drawings:

FIGURE 2 is a schematic view of another embodiment of the present invention;

FIGURE 3 is a schematic view of a third embodiment of the present invention.

Figure 1:
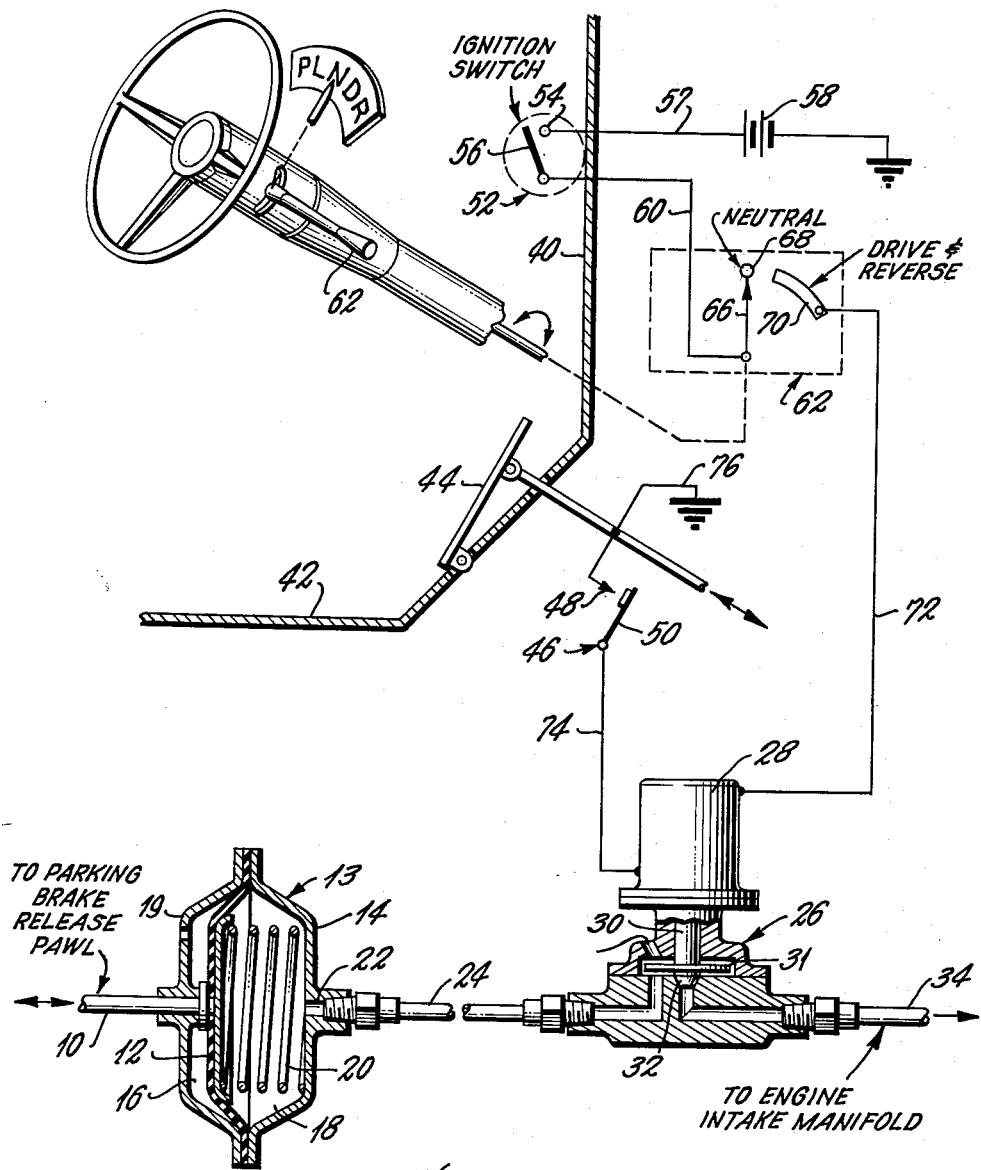
FIGURE 1 is a schematic view of the elements forming one embodiment of the automatic parking brake release system of the present invention.

In general, the automatic brake releasing system of this invention comprises brake setting means of the manual type for initially setting the emergency brake in the on position. Pneumatic means are coupled to the manual setting means for releasing the brake. A source of negative pneumatic pressure is obtained from the engine intake manifold when the engine is operating. A conduit or the like connects the source of negative pressure with the pneumatic brake releasing means, and valve means are incorporated in the conduit for controlling the operation of the pneumatic brake releasing means to release the brake. The valve means are actuated in response to the conditions of intended vehicle movement, including selection of movement producing gear of the transmission and depression of a foot pedal of an accelerator or clutch. Thus, three conditions of intended vehicle movement must be met for automatically releasing a set parking brake, the engine must be running to develop the actuating pressure, the transmission selector must be shifted to a vehicle movement position and the foot pedal controlling the accelerator or clutch must be depressed.

In one embodiment the valve means is solenoid operated with the solenoid in a series electrical circuit with switches controlled by transmission selection and pedal depression as described. In another embodiment of this invention, the system is completely pneumatic and pneumatic valve means associated with the accelerator pedal and the transmission selector gear provide for automatic releasing of the parking brake, under the same conditions as outlined above.

In a third embodiment, means are provided for deactivating the brake release system when the brake is released. An accumulator may be used in all three embodiments for storing sufficient vacuum to prevent loss of vacuum during extremely high acceleration conditions.

Referring now to FIGURE 1, there is shown schematically a partial electrical-pneumatic system for providing automatic release of the parking brake (not shown) for a typical vehicle such as an automobile or a truck. The system includes a horizontally extending actuator rod 10 connected directly to the parking brake pawl member which is normally manually set by either hand operated means situated under the dashboard of a conventional vehicle structure or by a foot operated brake setting device, such as a pedal located on the floor of the vehicle. The rod 10 is connected directly to a laterally movable diaphragm member 12 of pneumatic actuator 13 which is positioned centrally of a casing member 14, the casing member 14 and the movable diaphragm 12 acting to form a pair of closed chambers 16 and 18 on either side of the diaphragm 12. A vent 19 is provided for chamber 16, allowing unhampered movement of diaphragm 12 to the left which would otherwise result in compression of air or other fluid in this chamber. A compression spring 20 positioned within the right-hand chamber 18 between the casing member 14 and diaphragm 12 tends to normally bias the diaphragm 12 and the rod 10 to the left, as viewed in FIGURE 1.

A suitable opening 22 formed within the casing 14 allows connection of conduit 24 establishing fluid communication to chamber 18. A solenoid valve 26 is attached to the conduit 24 with the solenoid including a coil 28 surrounding a movable core or plunger 30 which acts as a reciprocating valve member. Valve member and solenoid core 30 cooperate with a valve seat 32 to control fluid communication between the pneumatic actuator 13 and the intake manifold of the engine through an extension conduit 34. It is apparent that by energization of the solenoid valve coil 28, the plunger 30 will be moved off its seat and the intake manifold pressure of the engine will be connected through conduits 32 and 24 to the right-hand chamber 18 of the pneumatic actuator 13. A negative gage pressure, i.e., vacuum within chamber 18, will cause the diaphragm 12 to move to the right against the bias of spring 20 moving actuator rod 10 to the right also. This results in the release of the brake pawl and the parking brake which has been previously set in the manner of the conventional parking brake systems.

When resetting the diaphragm to the left (in the position indicated in FIGURE 1), which occurs upon de-energization of solenoid coil 28, the plunger 30 again seats against sealing surface 32. This would normally result in leaving chamber 18 under the vacuum supplied by the exhaust manifold. However, there is provided a vent 33 which allows the pressure in chamber 18 to rise to atmospheric. The pressure change along with the bias of compression spring 20 results in rapid movement of diaphragm 12 to the left. The vent 33 is sealed by disk member 31, rigidly coupled to plunger 30, during energization of coil 28, allowing chamber 18 to be subjected to full vacuum from the intake manifold.

In order to provide a system wherein the automatic operation of the parking brake release system occurs only at the time the operator actually wishes the vehicle to move either in a forward or reverse direction under normal circumstances, there is provided an electrical circuit including three normally open switches, all of which must be closed prior to release of the parking brake. There is shown schematically a forward wall 40 and a floor 42 of a conventional vehicle structure such as an automobile or a truck. These vehicles normally incorporate an accelerator pedal such as indicated at 44 which is pivoted at one end and spring biased in an outward or upward direction. The accelerator pedal 44 of the present invention incorporates a normally open, single pole, single throw switch 46 which will close upon a slight depression of the accelerator pedal such as that occurring during normal start-up operation when the operator wants the vehicle to be accelerated in either a forward or reverse direction. Movement of the accelerator pedal in a downward direction closes normally open contacts 48 and 50 of switch 46.

The vehicle also includes the conventional ignition switch 52 which is also of the single pole, single throw variety including normally open contacts 54 and 56 which are adapted to be closed by rotation of the ignition key within the switch member. The stationary contact 54 of the ignition switch is connected by means of conductor 57 to a battery 58 and then to ground. The moving contact 56 of the ignition switch 52 is connected by means of conductor 60 to a third normally open switch coupled directly to the transmission selector lever indicated at 62. The transmission selector here is shown to be typical of the automatic drive selection type but may be of any conventional type. The switch 62 is a single pole, double throw switch which is normally open for neutral setting of the transmission for starting the motor of the car, but is adapted to be closed for the drive and reverse settings of the transmission. As indicated, the transmission control switch 62 includes a movable contact member 66 which is adapted to contact one stationary contact member 68 which connects the electrical battery to a conventional starting relay (not shown) while further movement of the transmission selector lever to either the drive or reverse settings causes the movable contact member 66 to contact a second stationary contact member 70 allowing completion of the circuit from the ignition switch 52 to the solenoid coil 28 through conductor 72. In conventional automotive electrical systems there is a switch, controlled by the automatic transmission lever or buttons, in circuit with the starting relay for preventing starting when the transmission is not in neutral position, switch 62 would replace such a conventional switch while providing the same function by means of contact 68.

The electrical circuit includes, when the three normally opened switches 46, 52 and 62 are in the closed position, the battery 58, conductor 57, contacts 54 and 56 of the main ignition switch 52, conductor 60, contacts 66 and 70 of the transmission control switch 62, conductor 72, electrical solenoid coil 28, conductor 74, accelerator switch contacts 48 and 50 and conductor 76 to ground. Thus, all three of the normally open switches 46, 52 and 62 must be closed in order to energize solenoid valve 26. Furthermore, the engine must be running to develop intake manifold vacuum to thereby release the parking brake.

In the operation of the system shown in FIGURE 1, the operator sets the parking brake by means of a conventional foot pedal or a hand operated lever or rod (not shown), depending upon the design of the vehicle. In this condition, the actuator rod 10 will be positioned to the left whereby the relative volume of chamber 18 will be much greater than that of chamber 16 within pneumatic actuator 13. The chamber 18 of the actuator is at this time cut off from the intake manifold by plunger 30 being seated on seat 32 with coil 28 de-energized. To start and drive the vehicle when the car has not been in operation and the engine is stopped, the operator, of course, turns the main ignition switch 52 closing normally open contacts 56 and 54 and with the transmission selector in the neutral position, the movable contact 66 of the transmission control switch will be on stationary contact 68 allowing the energization of the starting relay and the conventional starting of the car engine will ensue. With the engine running, the operator selects the gear, whether reverse, or forward, and the movement of the transmission selector gear changes the position of movable contact 66 of the transmission control switch 62 moving it from the neutral setting at contact 68 to the drive and reverse contact 70. The operator now barely depresses the accelerator pedal and upon initial depression, the movable contact 48 contacts stationary contact 50 of the accelerator pedal switch 46 causing the completion of the series electrical circuit through the accelerator switch 46, the solenoid valve 26, the transmission control switch 62, the main ignition switch 52 and battery 58. Energization of the solenoid coil 28 results in an upward movement of the solenoid coil plunger 30 allowing the chamber 18 of the actuator 13 to be connected directly to the intake manifold of the engine. The intake manifold vacuum will cause a decrease in pressure within chamber 18 causing diaphragm 12 to move to the right against the bias of spring 20 resulting in the mechanical release of the parking brake pawl through the medium of the operating rod 10, thereby releasing the parking brake.

It is apparent that the present brake release system requires that all of the conditions necessarily inherent in the actual movement of the vehicle in either forward or reverse direction must be met prior to the automatic release of the parking brake. This type of system is particularly useful as a 'hill holder" to maintain the vehicle in a fixed position when it is necessary to stop on a hill. While many automotive vehicles today incorporate means where the vehicle will be held where there is a slight incline, this is not so where the incline becomes relatively steep. In such a case, it is necessary for the operator to either hold his foot on the conventional braking pedal to brake the vehicle with the primary brake system, or it is necessary for the operator to set the emergency brake. With the present system, if the emergency brake is set, it only requires the operator to depress the accelerator pedal slightly after selecting a desired gear to insure that the vehicle will be allowed to proceed in the desired direction. It is apparent that little or no modification of conventional vehicle drive systems are necessary to incorporate the automatic parking brake release system of the present invention within such a vehicle. For instance, where the vehicle makes use of a foot operated clutch pedal, rather than an automatic drive system, the clutch pedal may include a single pole, single throw switch which will be inserted in the series circuit and will act in a manner similar to the switch 46 incorporated in the accelerator pedal structure of the embodiment shown in FIGURE 1.

While there is shown in FIGURE 1 a system incorporating a partial electrical circuit for releasing the parking brake automatically, it is not necessary that an electrical circuit be employed. For instance, in the embodiment shown in FIGURE 2, wholly pneumatic and mechanical means are employed for insuring that the parking brake is automatically released under similar conditions as set forth when making use of the system employed in the embodiment of FIGURE 1.

Referring now to FIGURE 2, there is shown a horizontally movable, actuator rod member 110 which is directly coupled to a laterally moving flexible diaphragm member 112 positioned centrally of actuator 113 within casing member 114. In like manner to the embodiment of FIGURE 1, a pair of chambers 116 and 118 are formed, respectively, on the left and right side of the diaphragm 112. A vent 117 is provided for chamber 116. Suitable biasing means, such as spring 120, acts to bias the diaphragm 112 to the left within the actuator 113. A conduit 124 is attached to the right side of the actuator and connects with chamber 118 through opening 122.

The interior of the vehicle is shown schematically by use of side wall and floor partition lines indicated at 140 and 142, respectively, with an accelerator pedal 144 pivotally mounted on the floor 142 and including a downwardly directed actuator rod 146. The rod 146 is mechanically connected to a release valve 148 which is shown in partial cross section.

The entire system comprises a series pneumatic circuit including conduit 124 which is coupled to one side of the release valve 148 through terminal member 152, while an outlet line 154 is coupled to the other side of the actuator valve 148 through a like coupling terminal 156. Also in the series pneumatic circuit is a blocking valve 174 connected to conduit 154 and to a conduit 150 connected to the engine intake manifold.

The release or trigger valve 148 includes housing 158 having a central bore 160 which receives a reciprocating piston member 162. A biasing spring 164 is positioned between flange 166 formed integrally of piston 162 and one of the end walls of casing member 158, the biasing spring being preferably positioned on the side of the release valve 148 opposite that of the linkage connecting the release valve to the accelerator pedal, or other accelerator means. The compression spring 164 when fully extended, positions the plunger in the fully released position. When installed on the vehicle, the valve spring 164 is compressed when the pedal is in the idle position, thus interrupting the vacuum connection to the actuator 113, and permitting the chamber 118 to be vented through vent hole 172. In this regard, the slidable piston member 162 includes a circumferential groove portion 168 which acts to connect together the conduits 154 and 124 when the accelerator pedal is depressed. An elongated groove 170 is formed within the plunger adjacent the circumferential groove portion 168 but spaced therefrom, the groove 170 acting to connect conduit 124 to the vent hole 172 when the accelerator pedal is in the release position, thereby venting chamber 118 of the actuator member 113 to the atmosphere.

Positioned between conduits 154 and 124 and connecting the release valve 148 to the actuator 113, is blocking valve 174. The blocking valve 174 is adapted to be actuated by the transmission selector lever 176 which acts through suitable, conventional mechanical linkage means. The blocking valve 174 includes a housing member 178 having a central bore 180 which is adapted to receive cylindrical valve port member 182 having a series of transverse openings or communicating passages 184, 186, and 188. The housing member 178 also includes a laterally extending terminal portion 190 which is connected to the release valve 148 through conduit 154. In like manner a second laterally extending terminal portion 192 connects the other side of the housing member to conduit 150 leading to the engine intake manifold and thereby connecting the series pneumatic circuit to a source of fluid pressure (vacuum) when the engine is running. A transverse bore 196 extends laterally across the housing member 178 from the terminal portion 190 to 192. Enlarged slots 194 and 195 are formed in housing 178 to establish fluid connections between bores 196 and openings 184, 186 and 188.

With housing member 178 and cylindrical member 182 fixedly supported, a central spool-shaped piston member 198 is adapted to reciprocate within cylindrical member 182 and is utilized to direct pneumatic fluid from terminal portion 190 to the other terminal portion 192 through one of the various transverse openings 184, 186 and 188 by means of circumferential groove 200 formed centrally of piston member 198. The blocking valve 174 is so designed that movement of the transmission selector lever 176 to a position other than neutral results in a free passage existing from terminal 190 to terminal 192 while positioning of the transmission selector lever in the neutral position will result in the complete blocking of the circumferential groove 200 as indicated by the position shown. It can be appreciated that by viewing transmission position symbols 202 on the indicator element adjacent selector lever 176, movement of the transmission selector lever to the reverse position, marked "R," will move spool piston 198 to allow fluid communication through transverse bore 196, enlarged slot 194, transverse openings 184, circumferential groove 200, enlarged slot 195 and transverse bore 196. In like manner, movement of the selector lever to the drive position D will result in a passageway being formed through transverse passages 186 while movement of the lever to the low drive position L will result in a passageway being formed through transverse grooves 188.

The operation of the system shown in FIGURE 2 is similar to that of the system of FIGURE 1. Assuming that the operator has come to a complete stop and has set the parking brake, the rod 110 will be in the position indicated, with chamber 118 being larger than chamber 112 as determined by the bias of the spring 120. Assuming also that the transmission selector lever is at this time in either the park position P, or neutral position N, and that the accelerator pedal is in the up position shown, both the release valve 148 and the blocking valve 174 will be in such a position as to prevent the intake manifold from being connected by means of conduits 150, 154 and 124 to the actuator 113. After starting the engine with the transmission in neutral as is conventional, the operator moves the transmission selector lever 176 to either the reverse, drive or low position depending upon the response he desires. This will move the piston member 198 to the right or left within the blocking valve 174 causing the circumferential groove 200 to line up with one of the transverse openings of the intermediate cylindrical member 182, such as 184, 186 and 188. This will provide a free passage between conduits 150 and 154. At the same time, the operator depresses the accelerator pedal 14 slightly causing the piston member 162 to move inwardly, lining up circumferential groove 168 with the transverse bore 153 of the release valve creating a free passage from the engine manifold to chamber 118 of the actuator 113. Subjecting the chamber 118 to engine intake manifold vacuum causes the diaphragm 112 to move to the right carrying the actuator rod 110 in the same direction, the result being the release of a parking brake. It is evident that without the engine running there will be no intake manifold vacuum and therefore the running of the engine is a prerequisite to either system.

While the two systems indicate that the parking brake is released automatically when the vehicle is moved in either the forward or reverse direction, it should be apparent that the parking brake may also be set and released manually in the usual manner. However, the system will not release the parking brake inadvertently because it can only function when the operator has the definite intention of moving the vehicle in either forward or reverse direction.

Since driving conditions vary, and since the system is adaptable to various types of vehicles employing various type loads, operating at varying degrees of speed, it may be necessary to employ some means for insuring sufficient vacuum to operate the release mechanism, even under circumstances where it is desirable to achieve extremely high acceleration from the braked or stopped position. FIGURE 3 shows an embodiment of the present invention, which is generally the same as the embodiment of FIGURE 2 with the inclusion of a pneumatic accumulator to prevent the failure of the system even if the operator should step on the accelerator pedal and force it to the floorboard as quickly as possible in an effort to achieve extremely high acceleration. In the system shown in FIGURE 2, under such circumstances, the vacuum may be lost before there is sufficient time to operate the release mechanism. At the same time, there are instances when it is desirable to de-activate the brake release system as soon as the brake is released, otherwise the manual release lever operates every time the accelerator pedal is released or depressed. Since during normal driving, there occurs a great number of instances in which the accelerator pedal is released or depressed, there may result excessive wear on the elements making up the system. This difficulty is eliminated by using a de-activating valve which vents the actuator chamber to the atmosphere when the brake is released. The valve is generally the same as the trigger or release valve associated with the accelerator pedal of the embodiment of FIGURE 2.

Referring now to FIGURE 3, there is shown a system including a de-activating valve 210 which is positioned in line 124 between the actuator 113 and the trigger or release valve 148. The construction of this valve is identical with that of the release valve 148 and includes a casing 212 including a central bore 214 which receives a reciprocating piston member 216. A biasing spring 218 is positioned between flange 220 which may be integral with the piston and one of the end walls 222 of the casing member 212. In this manner, the biasing spring 218 biases the plunger to the right in such a position that an elongated groove 226 connects chamber 118 of actuator 113 to a suitable vent 224 formed within the casing 212 such that this chamber is normally vented to the atmosphere except when the emergency brake is set by manual means (not shown). The piston is coupled to the release pawl (not shown) by conventional linkage such that release of the brake release pawl operates to allow the biasing spring to move the plunger into the venting position. When the emergency brake is set, the piston is moved against the bias of the compression spring such that both sides of the conduit 124 are in direct communication through a circumferential groove 228 formed on the piston 216 and spaced slightly from the elongated groove 226 acting to vent chamber 118 to the atmosphere.

An accumulator 250 is positioned in line 150 between the blocking valve 174 and the engine intake manifold (not shown). The accumulator 250 comprises a cylindrical tank member 252 including a generally open top portion 254 which receives a generally disc-like cover 256 acting to provide a sealed chamber 257 within the accumulator. A cylindrical coupling 258 extends through the cover 256 and is connected directly to the conduit 150. A poppet-type valve 260 is also mounted within the cover and is of conventional construction. The valve includes openings or apertures 262 formed within the cover, which is covered by a valve disc member 264 biased in a closed position by use of compression spring 266. The poppet or check valve 260 is connected directly to a source of vacuum preferably the engine intake manifold allowing the accumulator tank to reach approximately the same pressure as the vacuum source. An increase in pressure within the accumulator tank chamber 257 acts to unseat the valve disc member 264 with the higher pressure within the tank compressing the biasing spring and connecting the accumulator tank 250 directly to the intake manifold. Thus, the accumulator tank stores sufficient intake manifold pressure or vacuum to insure that the actuator will receive substantial vacuum instantaneously enabling the automatic release of the brake pawl.

The operation of the embodiment shown in FIGURE 3 is quite similar to the system shown in FIGURE 2. If the operator has come to a stop, he will normally set the parking brake which will result in movement of the brake release rod 110. At the same time, the de-activating valve will be moved from the position indicated in FIGURE 3 since setting of the parking brake results in movement of the piston 216 to the left against the bias of the compression spring 218 causing the two sides of conduit 124 to be in direct communication through circumferential groove 228 of the piston. If the transmission selector lever is in one of the operable positions, the piston member 198 will be moved to the right or the left within blocking valve 174 to cause the circumferential groove 200 to line up with one of the transverse openings of the intermediate cylindrical member 182 to provide a free passage between conduits 150 and 154. At the same time, when operator depresses the accelerator pedal 144 slightly, the trigger release valve piston member 162 will move to the right causing the circumferential groove 168 to line up with the conduits 154 and 124 with the transverse bore 153 of the release valve creating a free passage from the engine manifold to chamber 118 of actuator 113. Regardless of whether the operator is accelerating the engine to the utmost, the accumulator will provide sufficient vacuum to enable the actuator 113 to release the parking brake pawl by causing movement of rod 110 to the right, insuring release of the parking brake pawl. Immediately upon the release of the brake pawl, the mechanical linkage between the brake pawl and the de-activating valve piston will result in movement of this piston to the left comprising the biasing spring and resulting in venting of the chamber 118 to the atmosphere through suitable vent means. Thus, continued operation of the vehicle involving depressing of the accelerator pedal or other means tending to actuate the trigger valve or release valve, will have no effect since chamber 118 is continuously vented to the atmosphere, and will remain so until the parking brake is again manually set by the operator.

While the accumulator tank 250 and de-activating valve 210 have been shown as employed in the fully pneumatic and mechanical system of the embodiment shown in FIGURE 3, these elements may likewise be applied either individually or together in the partially electrical embodiment shown in FIGURE 1. At the same time, depending upon the requirements of the individual systems, either the de-activating valve or the accumulator tank may be employed in the system to the exclusion of the other.

While particular apparatus have been shown to make up the preferred embodiments of the present invention, various substitutions may be made. For instance, the accelerator switch may be replaced with various means for performing the same function. For example, a pressure switch may be provided on the transmission which will sense the increase in pressure of the hydraulic oil in cases of automatic transmissions since as engine speed increases, the pressure of the hydraulic oil normally increases in some proportion. With regard to the embodiment of FIGURE 2, the release valve and the actuator are universal and may be applied to any automobile or truck in which there is a parking brake release mechanism. The blocking valve 174 may be designed specifically for a particular class of vehicles and as shown in FIGURE 2 the valve is applicable for the class of vehicles made by the Ford Motor Company which have the automatic drive position sequence shown. (There may also be another "drive position" which is not shown.) Where other manufacturers use a different sequence, it is merely necessary to position the openings blocking valve in accordance with the particular sequence desired. In those vehicles in which the transmission is controlled by push buttons it is only necessary to use another release valve actuated by the neutral button and another valve actuated by the park button if this position is provided.

While the systems have been described as being applicable to vehicles equipped with automatic transmissions, they may also be used on vehicles equipped with manual transmissions and clutches, though it is preferable on such vehicles to install the release valve of the wholly pneumatic apparatus to be operated by the clutch pedal so that slight movement of the clutch pedal in a direction of engagement will release the parking brake.

While there have been shown and described and pointed out the fundamental novel features of the invention as applied to preferred embodiments, it will be understood that various omissions and substitutions and changes in the form and details of the device illustrated and its operation may be made by those skilled in the art without departing from the spirit of the invention. It is the intention, therefore, to be limited only as indicated by the scope of the following claims.

What is claimed is:

1. In combination with an automotive vehicle having an engine which creates a pressure source different from ambient when running, a transmission selection mechanism, a foot pedal which is operated upon intended movement of the vehicle, and a settable parking brake having a release means when actuated effective to release the set brake, an improved apparatus for automatically releasing the parking brake upon the simultaneous occurrence of given conditions indicative of intended actual movement of the vehicle, the apparatus comprising; a fluid pressure operated brake releasing mechanism connected to the parking brake release means for actuation thereof, a conduit establishing fluid communication between the fluid pressure operated brake releasing mechanism and the fluid pressure source developed when the engine is running, valve means in said conduit adapted to control the application of fluid pressure from the fluid pressure source when the engine is running to the fluid pressure operated brake releasing mechanism, and valve control means responsive to both the transmission selection mechanism being set for intended vehicle movement and the foot pedal being operated for intended vehicle movement for controlling the valve means to allow the fluid pressure source created when the engine is running to operate the fluid pressure operated brake releasing mechanism to release the parking brake, whereby the parking brake is released automatically only upon the simultaneous occurrence of the conditions of engine running, the transmission selection being positioned in an actual drive position, and intended vehicle movement foot pedal operation.

2. An apparatus as defined in claim 1 wherein the valve control means comprises an electrical coil adapted to operate the valve means when energized and an electrical series circuit including a power source and the electrical coil, and at least two electrical switches in the series circuit, the switches being open when the vehicle would normally have the parking brake set, one of the switches adapted to be closed by the operation of the foot pedal upon intended movement of the vehicle and the other of the switches being adapted to be closed upon the transmission selection mechanism to an actual drive for intended vehicle movement, so as to require the simultaneous occurrence of both to complete the series circuit and operate the valve means.

3. An apparatus as defined in claim 2 wherein the series electrical circuit further includes an ignition switch so that the further simultaneous condition for completion of the circuit is that the ignition switch is closed.

4. An apparatus as defined in claim 1 wherein the valve means includes two valves in series in the conduit between the fluid pressure source when the engine is running and the fluid pressure operated brake releasing mechanism, one of the valves being actuated through mechanical linkage in response to the operation of the foot pedal upon intended movement of the vehicle and the other of the valves being actuated through mechanical linkage by the transmission selection mechanism upon positioning thereof to the drive position.

5. Apparatus as claimed in claim 4 further including a de-activating valve positioned in said conduit between the fluid pressure operated brake releasing mechanism and said two valves, said de-activating valve being operable, respectively, in a first position to allow the fluid pressure source to operate the fluid pressure operated brake releasing mechanism, and in a second position to allow said fluid pressure operated brake releasing mechanism to be vented to the atmosphere, and means connecting said de-activating valve to said manually settable parking brake whereby said valve is in said first position when said parking brake is set, and in said second position when said parking brake is released.

6. Apparatus as claimed in claim 5 further including an accumulator tank positioned in fluid communication between said fluid pressure source and said valves, said accumulator tank being closed and of a volume sufficient to insure operation of said fluid pressure operated brake releasing mechanism regardless of the acceleration of said automotive vehicle engine.

7. Apparatus as claimed in claim 1 further including an accumulator tank, means connecting said accumulator tank, said valve means and said source of fluid pressure, said accumulator comprising a fluid reservoir adapted to receive and store sufficient volume of low pressure fluid to insure operation of said fluid pressure operated brake releasing mechanism regardless of the acceleration of said automotive vehicle engine.

8. In an automotive vehicle having an engine which creates a pressure source different from ambient when running, a transmission selection mechanism, a foot pedal which is operated upon intended movement of the vehicle, and a manually settable parking brake, an improved apparatus for automatically releasing the parking brake upon the simultaneous occurrence of conditions indicative of intended movement of the vehicle, the apparatus comprising; a fluid pressure operated brake releasing mechanism connected to the parking brake for release thereof, a conduit establishing fluid communication between the fluid pressure operated brake releasing mechanism and the fluid pressure source developed when the engine is running, valve means in said conduit adapted to control the application of fluid pressure from the fluid pressure source when the engine is running to the fluid pressure brake releasing mechanism, valve control means responsive both to the transmission selection mechanism being set for intended vehicle movement and to the foot pedal being operated for intended vehicle movement for controlling the valve means to allow the fluid pressure source created when the engine is running to operate the fluid pressure operated brake releasing mechanism to release the parking brake, a de-activating valve positioned between said valve means and said fluid pressure operated brake releasing mechanism, and means connecting said de-activating valve and said parking brake, whereby said de-activating valve vents said fluid pressure operated brake releasing mechanism upon release of said parking brake and said brake releasing mechanism is unaffected by further movement of said foot pedal.

9. Apparatus as claimed in claim 8 including an accumulator tank positioned between said valve means and said source of fluid pressure, said accumulator tank acting to store a suitable volume of low pressure fluid to insure actuation of said fluid pressure operated brake release mechanism regardless of acceleration of said automative vehicle engine.

10. An automatic parking brake release system comprising; parking brake setting means, a pneumatic actuator for releasing said parking brake, a source of pneumatic pressure, a release valve positioned between said source of pressure and said actuator and operable in response to depression of said accelerator pedal to connect said source and said actuator, a blocking valve positioned between said release valve and said source, a transmission selector lever acting to open said blocking valve only when said lever is positioned in any one of the plurality of drive positions, a de-activating valve between said pneumatic actuator and said release valve, said re-activating valve being operable in response to setting of said parking brake for connecting said source to said actuator, and operable in response to release of said parking brake for venting said pneumatic actuator to the atmosphere, said parking brake being automatically released when said engine is running, the transmission is in gear and the accelerator is depressed slightly.

11. Apparatus as claimed in claim 10 further including accumulator means positioned between said pneumatic pressure source and said blocking valve, said accumulator means including a low pressure fluid reservoir of sufficient volume to enable said pneumatic pressure to operate said pneumatic actuator regardless of acceleration of said engine.

12. An automatic brake release system for a vehicle having an accelerator pedal therefor, a transmission selector lever, and a settable parking brake having a release means effective upon actuation for release of the brake, the improvement comprising a pneumatic actuator connected to said release means effective for actuation thereof, a source of pneumatic pressure formed by the vehicle during its operation, means for communicating the source of pneumatic pressure and the pneumatic actuator, a release valve positioned in series in the communicating means between said source of pressure and said actuator, and control means for the valve operable only in response to the simultaneous occurrences of depression of said accelerator pedal and the positioning of the transmission selector level in any of the actual drive positions to open said valve to permit actuation of the pneumatic actuator and thus the release means upon operation of the vehicle.

13. In an automotive vehicle having an engine which creates a pressure source different from ambient when running, a transmission drive selection mechanism, a foot pedal which is operated to affect intended movement of the vehicle, and a settable parking brake having a release mechanism effective upon actuation to release the set brake, an improved system for automatically releasing the parking brake upon simultaneous occurrence of given conditions indicative of intended actual movement of the vehicle, comprising a pressure operated means connected to the release mechanism for actuation thereof, a conduit establishing communication between the pressure operated means and the pressure source developed when the engine is running, valve means in said conduit adapted to control the application of pressure from the pressure source to the pressure operated means, and valve control means responsive to the simultaneous occurrence of the transmission selection mechanism being set in an actual drive position for intended vehicle movement and the foot pedal being depressed for intended vehicle movement for controlling the valve means.

14. In an automotive vehicle having an internal combustion engine that creates an intake manifold vacuum upon operation thereof, a transmission selection mechanism, an accelerator pedal, and a manually settable brake having a release mechanism effective when actuated to release the set brake, an improved apparatus for automatically releasing the brake when set upon the simultaneous occurrence of at least three conditions indicative of actual intended movement of the vehicle, the apparatus comprising a vacuum operated means connected to the brake release mechanism for actuation thereof, a conduit connecting the vacuum operated means with the intake manifold effective to cause the intake manifold vacuum to operate the means, a valve in series in the conduit for controlling the application of intake manifold vacuum to the vacuum operated means, and control means for the valve from the accelerated pedal and the transmission selection mechanism for opening the valve only upon the simultaneous occurrence of certain conditions of the accelerated pedal and the transmission selection mechanism including, respectively, depressing the accelerator pedal and positioning the selection mechanism in an actual vehicle drive position, so that only upon the simultaneous occurrence of the engine running, the transmission selection mechanism being in the drive position, and the accelerator pedal being depressed, will the vacuum operated means and the brake release mechanism be actuated to release the brake.

15. In a conventional automotive vehicle including an accelerator, a transmission selector, an ignition switch, a manually settable brake having a release mechanism effective upon actuation to release the set brake, and pressure producing means responsive to intended operation of the vehicle, an automatic brake releasing system comprising pressure operated means connected to the release mechanism effective when operated to actuate said mechanism, means communicating said pressure producing means to said pressure operated means for operation thereby, valve means in said communicating means for controlling the operation of said pressure operated means, an electrical actuator for controlling said valve means, and a series electric circuit for energizing said electrical actuator and including a source of electric current, first and second normally open switches, and the ignition switch, the first normally open switch being connected to and closed by depression of said accelerator, and the second normal open switch being connected to and closed by said transmission selector only when the latter is positioned at actual drive positions for the vehicle, whereby the brake will be automatically released only upon the simultaneous closing of all of said switches and by the intended operation of the vehicle to actuate the pressure producing means.

References Cited in the file of this patent

UNITED STATES PATENTS

| | | |
|---|---|---|
| 2,174,464 | Givens | Sept. 26, 1939 |
| 2,789,667 | Tannenbaum | Apr. 23, 1957 |
| 2,867,310 | Martin | Jan. 6, 1959 |
| 2,910,156 | Apple | Oct. 27, 1959 |